(12) United States Patent
Kotwicz Herniczek et al.

(10) Patent No.: US 12,510,127 B2
(45) Date of Patent: Dec. 30, 2025

(54) SKEWED ROLLER IMPELLER CAGE FOR USE WITH A ROTARY NO-BACK DEVICE

(71) Applicant: Eaton Intelligent Power Limited, Dublin (IE)

(72) Inventors: Logan Marie Kotwicz Herniczek, Madison, MS (US); Tyler Quincey Curtis, Rockford, MI (US)

(73) Assignee: Eaton Intelligent Power Limited, Dublin (IE)

( * ) Notice: Subject to any disclaimer, the term of this patent is extended or adjusted under 35 U.S.C. 154(b) by 110 days.

(21) Appl. No.: 18/306,590

(22) Filed: Apr. 25, 2023

(65) Prior Publication Data

US 2024/0360881 A1 Oct. 31, 2024

Related U.S. Application Data

(60) Provisional application No. 63/334,554, filed on Apr. 25, 2022.

(51) Int. Cl.
| | |
|---|---|
| *F16D 65/78* | (2006.01) |
| *F16C 33/34* | (2006.01) |
| *F16D 59/00* | (2006.01) |
| *F16D 63/00* | (2006.01) |
| *F16D 65/02* | (2006.01) |
| *B64C 13/38* | (2006.01) |

(52) U.S. Cl.
CPC .............. *F16D 65/78* (2013.01); *F16D 59/00* (2013.01); *F16D 63/00* (2013.01); *F16D 65/028* (2013.01); *B64C 13/38* (2013.01); *F16D 2065/022* (2013.01); *F16D 2065/788* (2013.01)

(58) Field of Classification Search
CPC .......... F16C 33/34; F16D 65/78; F16D 59/00; F16D 63/00; F16D 65/028; F16D 2065/022; F16D 2065/788; B64C 13/38
See application file for complete search history.

(56) References Cited

U.S. PATENT DOCUMENTS

| | | | |
|---|---|---|---|
| 3,081,842 | A | 3/1963 | Zidler et al. |
| 3,897,860 | A | 8/1975 | Borek et al. |
| (Continued) | | | |

FOREIGN PATENT DOCUMENTS

| | | |
|---|---|---|
| CN | 104454969 A | 3/2015 |
| DE | 103 05 842 B4 | 7/2015 |
| (Continued) | | |

OTHER PUBLICATIONS

Extended European Search Report for Application No. 23169750.9 mailed Aug. 23, 2023.

*Primary Examiner* — Thomas W Irvin
(74) *Attorney, Agent, or Firm* — Merchant & Gould P.C.

(57) ABSTRACT

Aspects of the present disclosure relate to a skewed roller impeller cage including a metallic ring with radially arranged slots in which rollers are positioned. Impeller shaped channels are defined around a top side of the cage to force fluid to circulate from an outer diameter of the cage to an inner diameter of the cage and vice versa. Cutouts defined at the inner diameter of the cage allow fluid to circulate from the top side of the cage to the bottom side due to centrifugal forces moving the fluid from the inner diameter back to the outer diameter of the cage to allow for continuous circulation of the fluid about the cage.

21 Claims, 11 Drawing Sheets

(56) References Cited

U.S. PATENT DOCUMENTS

| | | | | |
|---|---|---|---|---|
| 4,850,458 | A | * | 7/1989 | Allan .............. F16D 59/00 188/134 |
| 5,101,953 | A | * | 4/1992 | Payvar ............ F16D 13/72 188/218 XL |
| 5,183,139 | A | | 2/1993 | Malecha |
| 5,582,390 | A | * | 12/1996 | Russ ............... B64C 13/28 244/99.2 |
| 5,671,835 | A | * | 9/1997 | Tanaka ............ F16D 65/127 192/113.36 |
| 6,089,363 | A | * | 7/2000 | Mimura ........... F16D 7/007 192/30 R |
| 6,109,415 | A | * | 8/2000 | Morgan ........... B64C 13/28 192/223.1 |
| 6,619,148 | B2 | | 9/2003 | Nishide |
| 6,997,297 | B2 | * | 2/2006 | Bartley ............ F16D 63/00 188/82.84 |
| 7,044,643 | B2 | | 5/2006 | Greubel |
| 8,393,568 | B2 | | 3/2013 | Maresko et al. |
| 9,435,411 | B2 | | 9/2016 | Eguchi et al. |
| 9,810,261 | B1 | * | 11/2017 | Gavriliuc ......... F16C 19/305 |
| 10,751,775 | B2 | | 8/2020 | Merz et al. |
| 11,181,073 | B2 | * | 11/2021 | Werquin .......... F02K 1/763 |
| 11,623,739 | B2 | | 4/2023 | Kulkarni et al. |
| 2002/0153213 | A1 | * | 10/2002 | Gruber ............. C04B 35/573 188/218 XL |
| 2005/0199464 | A1 | * | 9/2005 | Bartley ............ F16D 63/00 384/618 |
| 2008/0041675 | A1 | * | 2/2008 | Baumgartner ... F16D 65/12 188/218 XL |
| 2008/0302616 | A1 | * | 12/2008 | Kao ................. F16D 65/127 188/218 XL |
| 2020/0148330 | A1 | | 5/2020 | Barger |
| 2023/0341003 | A1 | * | 10/2023 | Potier .............. F16D 7/024 |

FOREIGN PATENT DOCUMENTS

| | | |
|---|---|---|
| EP | 0 979 360 B1 | 6/2004 |
| JP | 2007-192252 A | 8/2007 |
| JP | 2018-179009 A | 11/2018 |
| WO | 2006/035650 A1 | 4/2006 |

* cited by examiner

SKEWED ROLLER IMPELLER CAGE FOR USE WITH A ROTARY NO-BACK DEVICE

CROSS-REFERENCE PARAGRAPH

This application claims the benefit of U.S. Provisional Patent Application No. 63/334,554, filed on Apr. 25, 2022, the disclosure of which is incorporated herein by reference in its entirety.

TECHNICAL FIELD

The present disclosure relates generally to a skewed-roller brake assembly, and more particularly, to a skewed-roller cage design with improved lubricating oil circulation.

BACKGROUND

The maneuverability of an aircraft depends heavily on the movement of hinged sections or flaps located at the trailing edges of the wings. By selectively extending and retracting the flaps, the aerodynamic flow conditions of the wings may be influenced so as to increase or decrease the lift generated by the wings. For example, during the take-off and landing phases of a flight, the position of the flaps of the aircraft are adjusted to optimize the lift and drag characteristics of the wing. It can be appreciated the reliable operation of the flaps is of importance to an aircraft.

The flap control lever is connected by conventional and/or teleflex cables to a hydraulic actuating mechanism, which is commonly driven by a motor system. The flap actuator includes a shaft extending along a longitudinal axis and having a terminal end operatively connectable to the flap. The shaft is movable between a first retracted position and a second extended position.

In some examples, a no-back brake assembly is operatively connectable to the shaft. The no-back brake assembly can prevent movement of the shaft toward the retracted position in response to a compressive force generated by the flap. A skewed roller is one type of no-back brake. Skewed roller brakes develop friction between a pair of rotating axially loaded discs by rollers carried in a slotted cage. The axis of the slots in the cage are skewed or angled relative to a radial line from a center of rotation or rotational axis of the cage. As the rollers roll between the discs, they tend to provide sliding frictional resistance parallel to the rotational movement of the two discs. This allows the skewed-rollers to provide braking to a drive assembly through the application of frictional torque to the rotors. Skewed-rollers may be partially submerged in a lubricating oil to dissipate heat generated by the friction. The present disclosure addresses improvements in dissipating the heat generated.

SUMMARY

The present disclosure relates to a skewed roller assembly. The skewed roller assembly can include a disc formed as a thin metallic ring. The disc can have a first side and an opposite second side. In certain examples, the first side is a top side and the second side is a bottom side. The disc includes an inner diameter and an outer diameter. The disc is designed to be positioned against a flange on an actuator drive shaft.

The disc can include rectangular slots arranged radially in which rollers of a no-back device are positioned. The slots are defined through the disc and are skewed at a specified angle to generate a specific amount of friction which can be determined by the subjected axial load and speed of the actuator.

Impeller shaped channels are arranged on the first and second sides of the disc to force fluid to circulate from the outer diameter of the disc to the inner diameter of the disc when the disc is rotated in a first direction. The impeller shaped channels on the second side of the disc are in a reverse orientation to the impeller shaped channels on the first side of the disc. The impeller shaped channels on the second side of the disc force fluid to circulate from the inner diameter of the disc to the outer diameter of the disc when the disc is rotated in a second direction.

Cutouts may be defined at the inner diameter of the disc. In other examples, the cutouts may be defined on an outer diameter of the shaft of the actuator, although alternatives are possible. The cutouts can be positioned adjacent to the first and second plurality of impeller flow channels to scoop fluid for continuous circulation around the disc.

The fluid flows in the impeller shaped channels and centrifugal forces move the fluid from the top side to the bottom side or vice versa. The continuous circulation of fluid lubricates the rollers to improve heat dissipation in the system.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

A rotary no-back device may be integrated within an aircraft flight control actuation system, such a flap and/or slat system. There may be other applications the no-back device may be integrated with, including but not limited to, fuel doors. The no-back capability of the rotary no-back device will prevent an aircraft flight control surface from being displaced from a desired position if a failure occurs to the actuation system's drive line.

Figure 1:
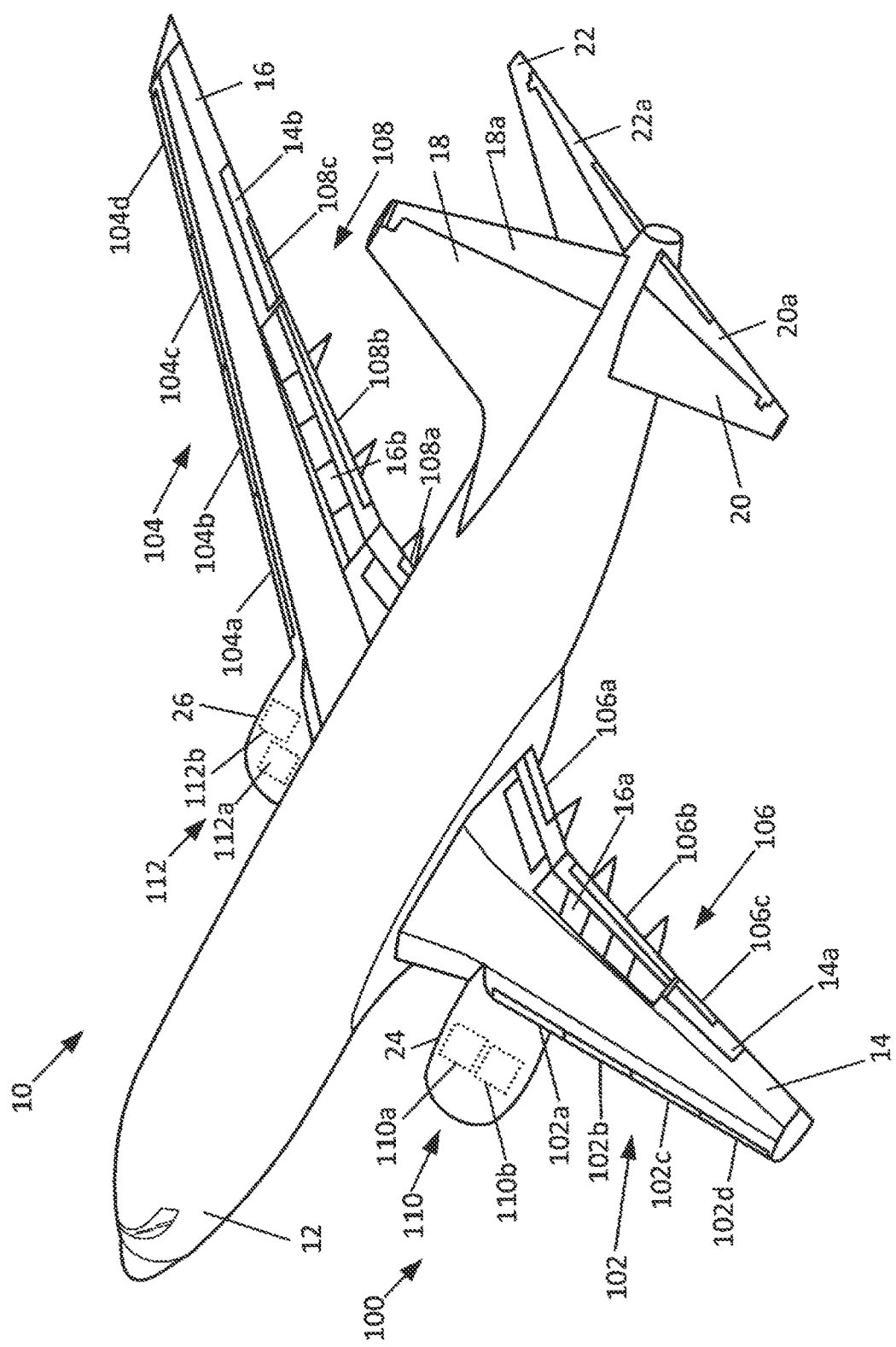
FIG. 1 illustrates a schematic view of an aircraft having features that are examples of aspects in accordance with principles of the present disclosure.

Referring to FIG. 1, a schematic representation of an example aircraft 10 is presented. In general terms, the aircraft 10 includes a fuselage 12, left and right wings 14, 16, a vertical stabilizer 18, and left and right horizontal stabilizers 20, 22. The aircraft 10 is also provided with a number of primary flight control surfaces for operating the aircraft 10 during flight. Examples of such primary flight control surfaces are ailerons 14a, 14b and spoilers 16a, 16b associated with the left and right wings 14, 16, a rudder 18a associated with the vertical stabilizer 18, and elevators 20a, 22a associated with the left and right horizontal stabilizers 20, 22. The aircraft 10 is also shown as being provided with jet engines 24, 26 respectively associated with the left and right wings 14, 16.

The aircraft 10 is also provided with a number of secondary control surfaces 100 which are generally used during take-off and landing procedures. Examples of such secondary control surfaces 100 are slats 102 (102a-102d) and flaps 106 (106a-106c) associated with the left wing 14, slats 104 (104a-104d) and flaps 108 (108a-108c) associated with the right wing 16, and thrust reversers 110 (110a, 110b), 112 (112a, 112b) respectively associated with the left and right engines 24, 26.

In one example use of the secondary control surfaces, the slats 102, 104 and flaps 106, 108 can be extended during takeoff to increase the overall size and lift of the wings 14, 16. In the extended position, the slats 102, 104 and flaps 106, 108 greatly increase the lift generated by the wings 14, 16, which in turn enables the aircraft 10 to take off more capably and under heavier loads. When takeoff is complete and the aircraft 10 enters a cruising phase, the slats 102, 104 and flaps 106, 108 can be retracted to reduce drag on the wings 14, 16 and therefore allow for more efficient operation. The slats 102, 104 and/or flaps 106, 108 can also be used during the landing procedure to reduce the required distance and speed to safely land the aircraft 10. In one aspect, the slats 102, 104 and flaps 106, 108 can be characterized as being high-lift devices.

In another example use of the secondary control surfaces, thrust reversers 110, 112 can be activated into an extended position to temporarily divert the thrust of the engines 24, 26. By activating the thrust reversers 110, 112, the diverted thrust acts against the forward direction of the aircraft 10 to provide deceleration just after touch-down such that the diverted thrust acts against the forward travel of the aircraft. The incorporation of thrust reversers 110, 112 therefore enables the aircraft 10 to land over a shorter distance and reduces the wear on the brakes of the aircraft 10. In one aspect, the thrust reversers 110, 112 can be characterized as forming part of a thrust reverser actuation system (TRAS).

Although one example of an aircraft 10 is presented with three examples of secondary control surfaces 100 (e.g., slats 102/104, flaps 106/108, thrust reversers 110/112), many other configurations of the aircraft 10 and secondary control surfaces 100 are possible without departing from the concepts presented herein.

Figure 2:
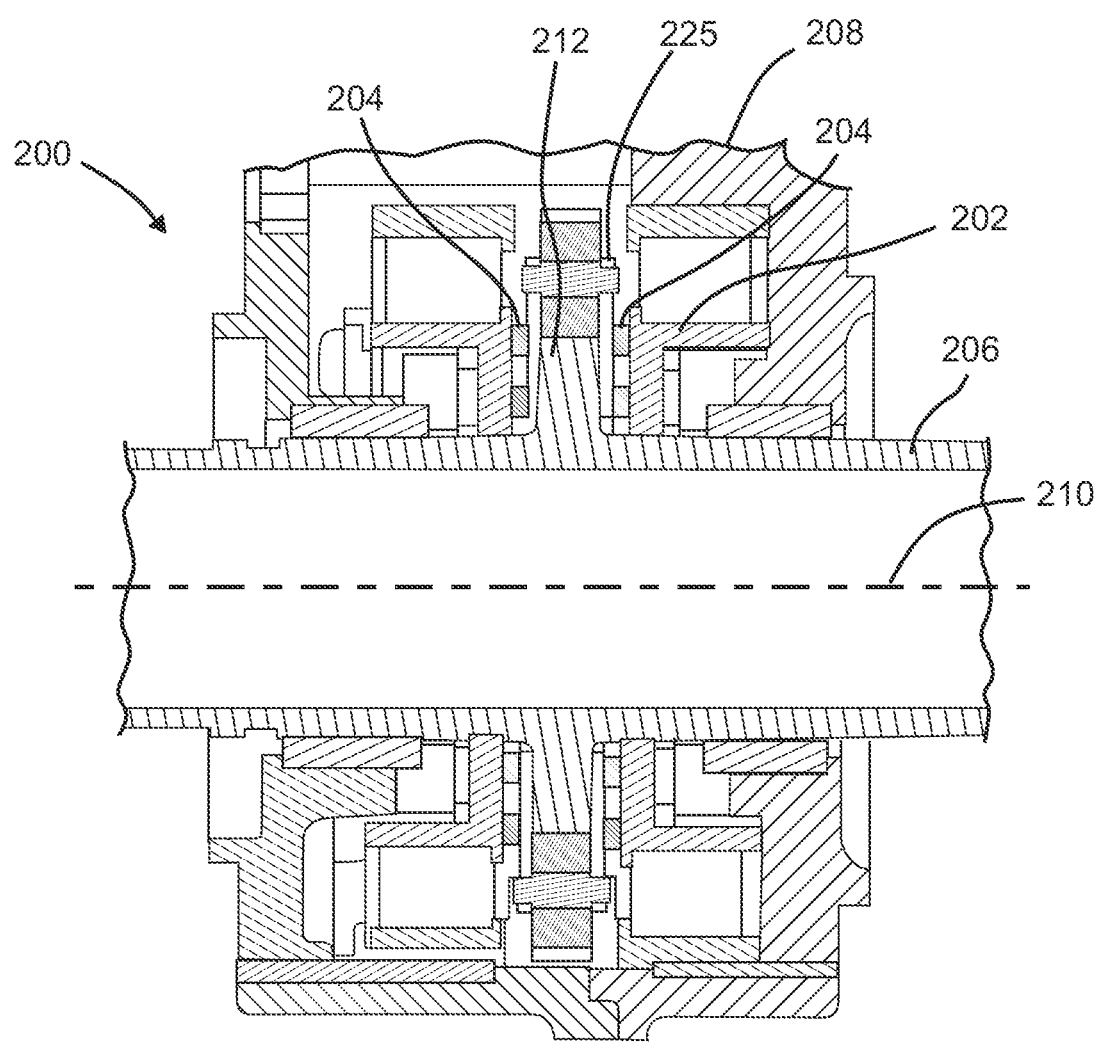
FIG. 2 illustrates a cross-sectional view of an example coupling assembly including a skewed roller impeller cage according to the principles of the present disclosure.

Referring to FIG. 2, an example rotary device assembly 200 is illustrated in accordance with principles of the present disclosure. In some examples, the rotary device assembly 200 may be configured as a brake to transmit force which restricts rotation of a member. In accordance with the present disclosure, the rotary device assembly 200 can relate generally to aircrafts, and in particular, to controlling the above-described primary and secondary control surfaces of the aircraft 10. However, it will be appreciated that the rotary device assembly 200 may be used in a wide variety of applications.

The rotary device assembly 200 may include a nonrotatable brake member 202, two roller bearing assemblies 204 disposed at least partially between a rotating member 206 (e.g., a ball screw, a shaft, etc.) and a stationary member 208 (e.g., a housing). It will be appreciated that the rotary device assembly 200 may have a different construction. For example, the rotary device assembly 200 may include a single skewed roller assembly 204. It will be appreciated that the two roller bearing assemblies 204 can have the same construction and mode of operation. As such, only one skewed roller assembly 204 will be described in detail.

The aircraft 10 may utilize the rotary device assembly 200 for controlling various aircraft flight surfaces. In certain examples, the slats 102 (102a-102d) and flaps 106 (106a-106c) associated with the left wing 14 and the slats 104 (104a-104d) and flaps 108 (108a-108c) associated with the right wing 16 can be pivoted by the rotary device assembly 200 provided in flap actuators or slat actuators of the aircraft 10. The rotary device assembly 200 can be operably coupled to the left and right wings 14, 16 of the aircraft 10 and to an associated one or more of the slats/flaps 102, 104, 106, 108 to execute the pivoting actions thereof. The rotary device assembly 200 is configured to transmit a torque from the rotating member 206 which is rotatable relative to the nonrotatable brake member 202. The rotary device assembly 200 can control pivoting of the slat/flap control surfaces with no-back capability. That is, the rotary device assembly 200 can prevent a loss of position control of the primary or secondary control surfaces by grounding the resultant torque to a structural ground to thereby lock the primary or secondary control surfaces in a fixed position. For example, the rotary device assembly 200 can be used to prevent loss of position control of the slats/flaps 102, 104, 106, 108 by grounding the resultant torque to thereby lock the slats/flaps 102, 104, 106, 108 in a fixed position.

A signal can be sent from a main system processor to a control surface actuation system usable to operate control surfaces of the aircraft 10, including but not limited to, the above-described primary and secondary control surfaces. The control surface can be driven by an actuator or multiple actuators. In some examples, a single actuator can be used to drive multiple control surfaces. In one aspect, the actuator can be used to drive a control surface by operating a member operably connected to the control surface. The actuator can be, for example, a linear acting actuator with a linear screw driven by a motor. In some examples, the member is operably connected to an actuator via a gear set, such as a planetary gear set. In some examples, the member is a part of an actuator, such as a shaft of an actuator. In some examples, a position sensor can be provided on an actuator for use in feedback control of the motor. The control surface can correspond to any of the control surfaces 14a/b, 16a/b, 18a, 20a, 22a, 102, 104, 106, 108 shown in FIG. 1.

The rotating member 206 may be connected with a horizontal stabilizer on the aircraft 10. The rotating member 206 may extend along the longitudinal central axis 210 and have a terminal end operatively connectable to the flaps and/or slats. The roller bearing assemblies 204 may facilitate rotation of the rotating member 206 relative to the nonrotatable brake member 202. The rotating member 206 is rotatable about its longitudinal central axis 210 while the stationary member 208 is held against rotation about the longitudinal central axis 210. The rotating member 206 has an annular flange 212 which is enclosed by the stationary member 208. The rotating member 206 and thus the flaps and/or slats of the aircraft 10 may be movable between a first retracted position and a second extended position.

The no-back capability of the rotary device assembly 200 prevents movement of the rotating member 206 toward the retracted position in response to a compressive force generated by the flaps and/or slats. Depending on the direction in which the rotating member 206 overruns, the flange 212 may be pulled toward a respective one of the two roller bearing assemblies 204. If the actuator extends as a result of pulling forces imparted to it by the flaps and/or slats, the no-back assembly is configured to resist that back driving force so it is not felt by the actuator. That is, if the flap applies a compressive force on the actuator, the actuator will not feel the external compressive force applied to it due to the no-back assembly designed to resist the back driving forces allowing the actuator to retract when driven to retract or extend when driven to extend.

Additional details about the construction and functioning of the rotary device assembly 200 are provided in U.S. Pat. No. 11,623,739, the disclosure of which is hereby incorporated herein by reference in its entirety.

Figure 3:
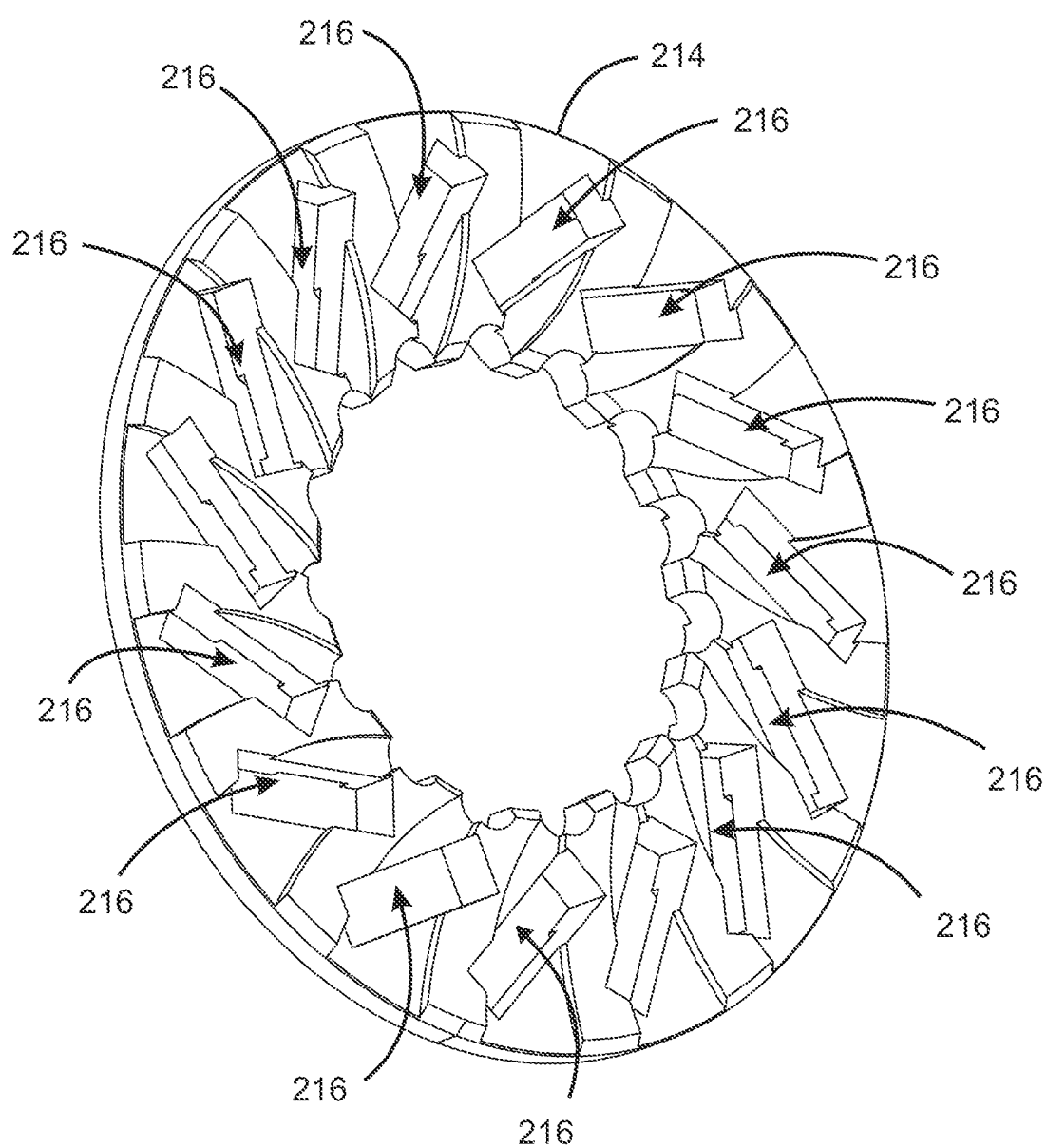
FIG. 3 illustrates a perspective view of a disc with skewed roller slots in accordance with the principles of the present disclosure.
Figure 4:
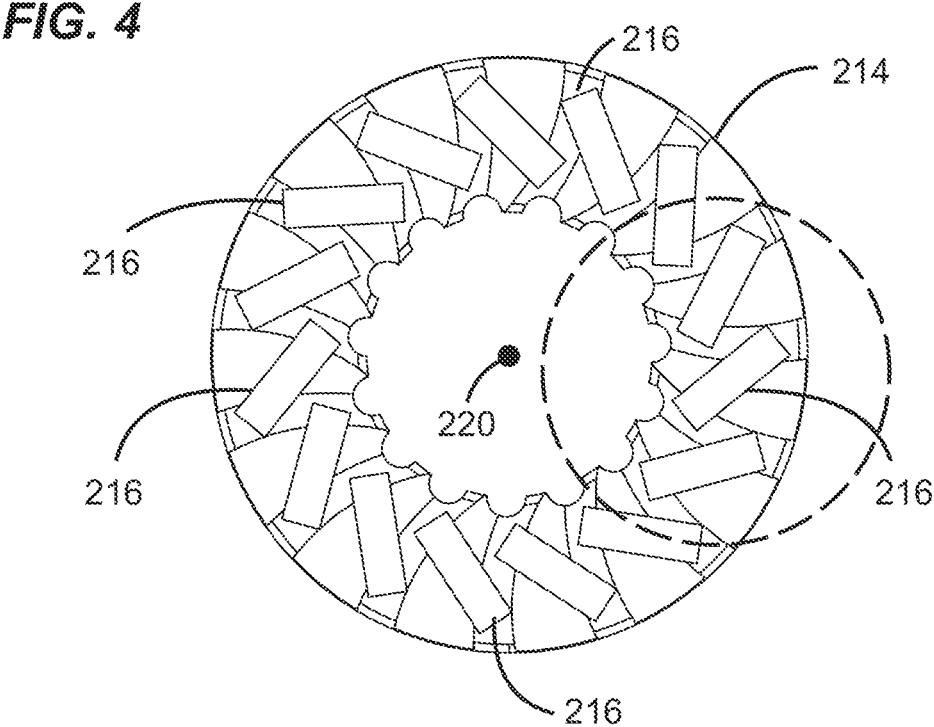
FIG. 4 illustrates a plan view of the disc of FIG. 3.
Figure 5:
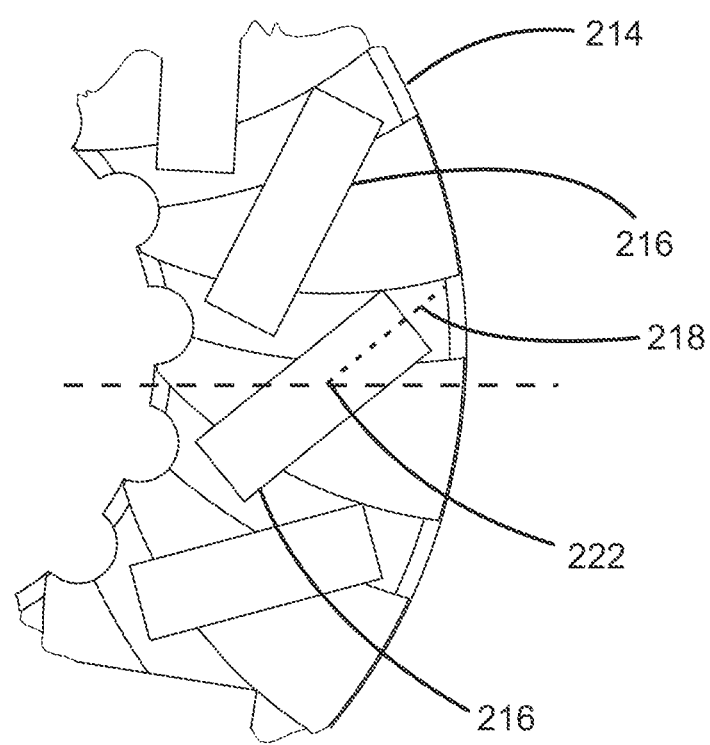
FIG. 5 illustrates an enlarged view of a portion of the disc of FIG. 4.
Figure 6:
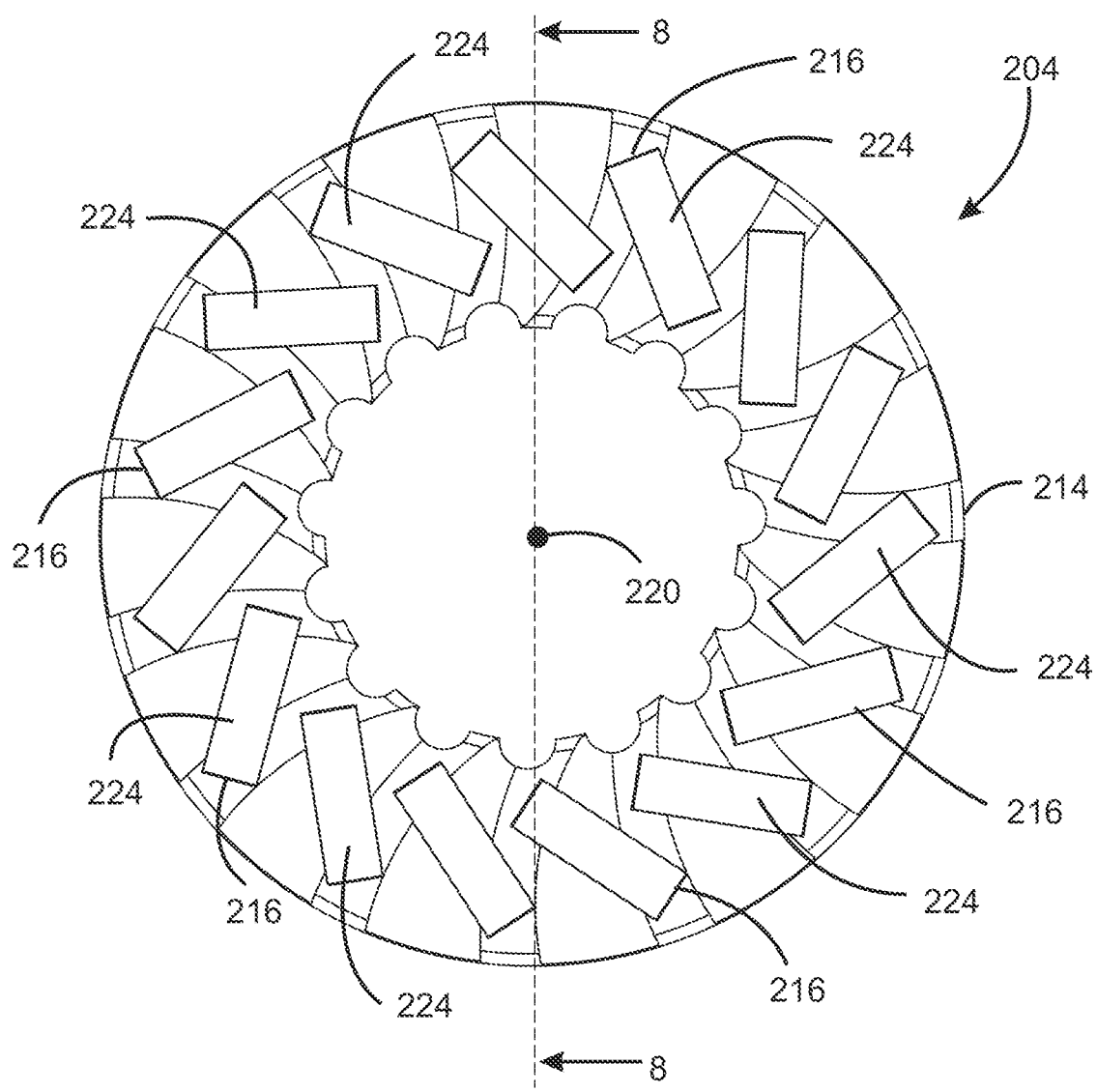
FIG. 6 illustrates a plan view of the disc of FIG. 4 including rollers in the skewed roller slots in accordance with the principles of the present disclosure.
Figure 7:
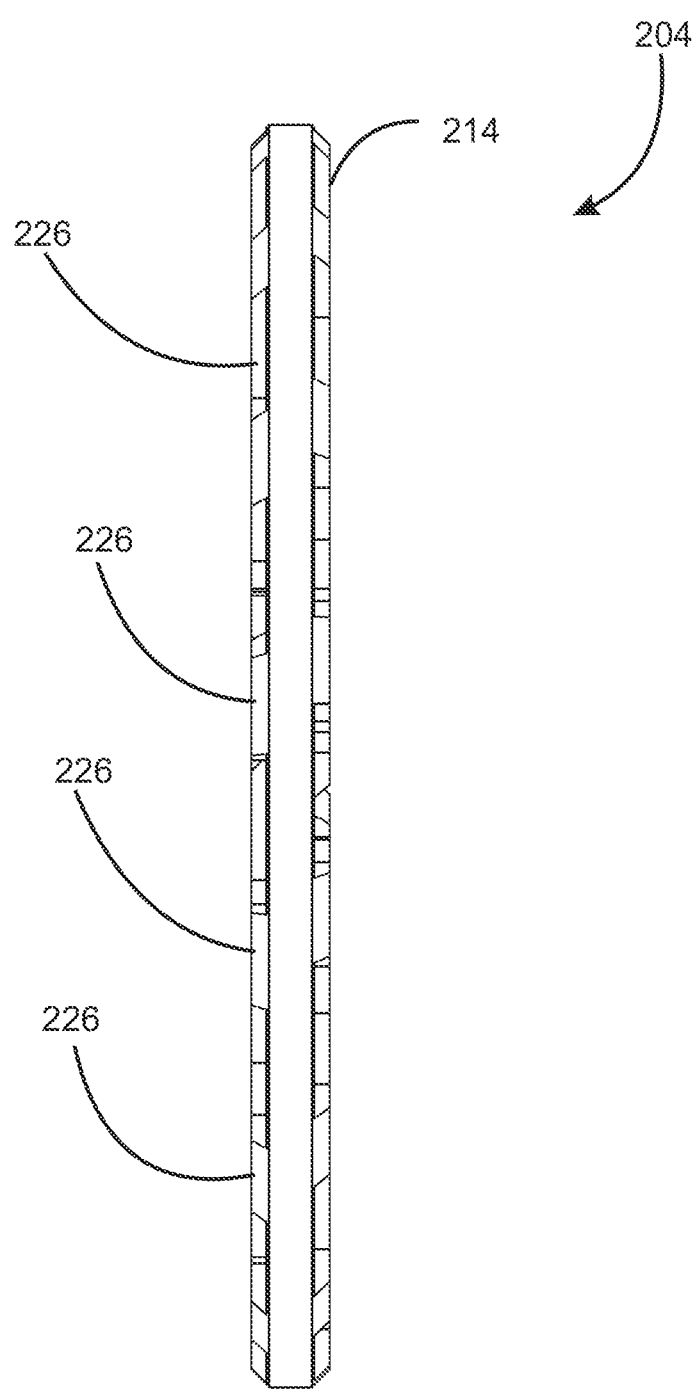
FIG. 7 illustrates a side view of the disc of FIG. 6.
Figure 8:
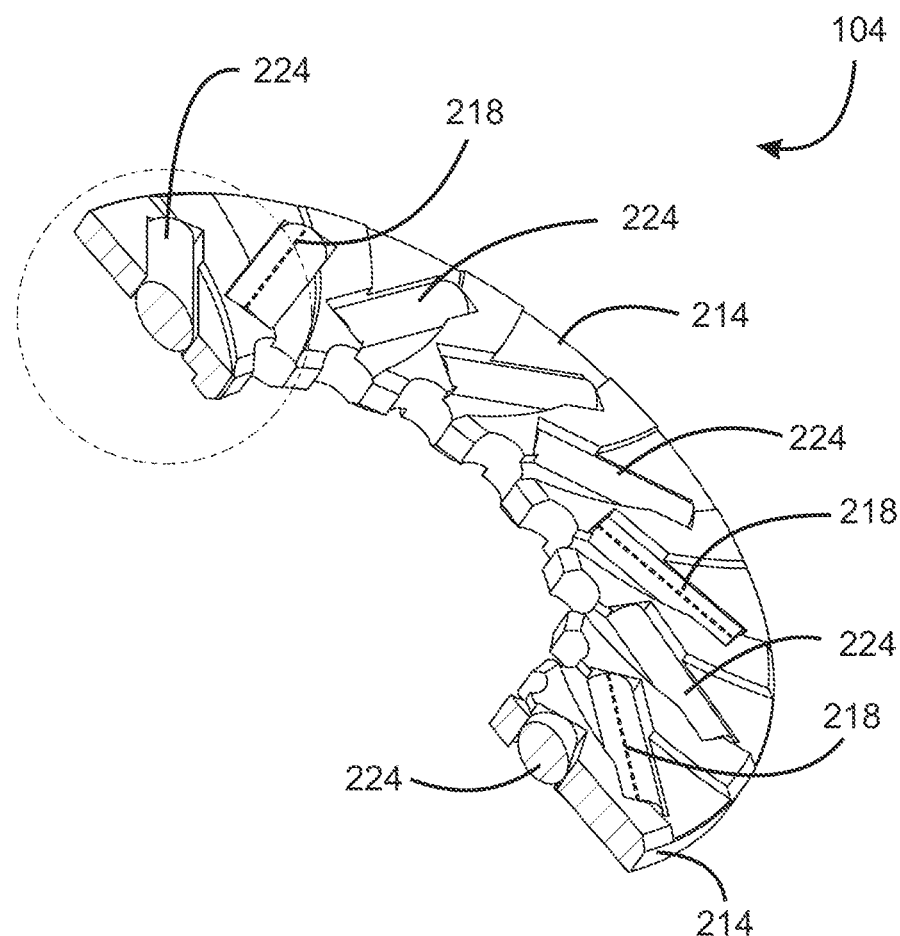
FIG. 8 illustrates a cross-sectional view taken along line 8-8 of FIG. 6.
Figure 9:
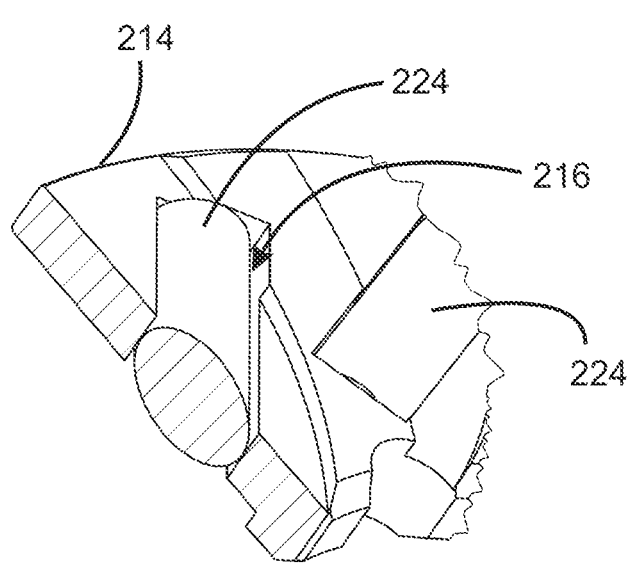
FIG. 9 illustrates an enlarged view of a portion of the disc of FIG. 8.

Turning to FIGS. 3-5, the skewed roller assembly 204 may include a circular or annular disc 214 (e.g., retainer member) with an annular array of spaced apart skewed-roller slots 216. The skewed-roller slots 216 may be formed through the disc 214. The circular or annular disc 214 may include one or more of a variety of shapes, sizes, configurations, and/or materials. The disc 214 may be a thin metallic ring that can be positioned against the flange 212. In certain examples, the disc 214 may comprise a brass material, although alternatives are possible. In other examples, the disc 214 may comprise a hardened steel, although alternatives are possible. In certain examples, the disc 214 may be machined or printed using an additive manufacturing process, although alternatives are possible.

The skewed-roller slots 216 may be rectangular slots that each extend generally in a radial direction. In certain examples, the skewed-roller slots 216 may be machined slots preferably evenly spaced around the disc 214. It will be appreciated that the skewed-roller slots 216 may be formed using a variety of processes. Each of the skewed-roller slots 216 may have a longitudinal central axis 218 that is skewed at an angle α relative to a disc radius 220 (i.e., central axis) that extends through a center 222 of the skewed-roller slot 216. That is, the skewed-roller slots 216 are skewed by an angle α relative to a radial line from the center 220 of the disc 214.

The skewed-roller slots 216 may be skewed at a specific angle to generate a desired amount of friction. The amount of friction can be determined by a subjected axial load and speed of an actuator drive shaft. In one example, the skewing angle α may be within the range of about 0 degrees to about 90 degrees. In certain examples, the skewing angle α may be within the range of about 30 degrees to about 60 degrees. In another example, the skewing angle α may be about 45 degrees. It will be appreciated that the skewing angle α may be optimized to provide a desired performance characteristics including, for example, friction and/or heat dissipation.

Referring to FIGS. 6-9, a respective roller 224 may be disposed in each of the skewed-roller slots 216. The skewed-roller slots 216 may be used for guiding and spacing the rollers 224. The rollers 224 may be rotatably mounted in an annular array on the annular disc 214 a distance from the center of rotation 220 of the disc 214. The rollers 224 are rotatable in the skewed-roller slots 216 about their respective axis 218. The rollers 224 are effective to transmit force between a plate 225 (see FIG. 2) connected with the flange 212 and the stationary member 208. When in use, the rollers 224 can be subject to high thrust loads and torques, resulting in high rotational speeds of the disc 214 and high friction on the roller surfaces which increases the temperature at the friction points. That is, friction may be transformed into and/or result in heat, and the amount of heat may correspond to a combination of thrust force, the coefficient of friction (COF), the friction radius R, and the spinning velocity of the disc 214, which may correspond, for example, to the spinning velocity of the rotating member 206. In some applications, it may be desirable to balance the heat dissipation of rollers such that they dissipate comparable, similar, and/or substantially the same amount of heat, independent of the friction radii R of the rollers.

Typically, skewed rollers are partially submerged in a lubricating oil to help dissipate any heat generated in the system. Although partially immerged, high rotational speeds of a disc/cage and the orientation of the skewed rollers may cause the lubricating oil to be carried away by centrifugal forces from an inner diameter of the disc/cage. At high speeds and torques, centrifugal forces carry the lubricating oil away from the friction surfaces of the rollers. Without the lubricating oil, the friction surfaces are left without lubrication and a means of dissipating the heat generated which may cause the friction surfaces to overheat and cause a no-back system to fail.

An advantageous feature of the skewed roller assembly 204 configured according to the present disclosure is the ability to manage the direction of fluid flow in the system by forcing fluid (e.g., lubricating oil, etc.) to circulate around the disc 214 continuously to lubricate the rollers 224 in the skewed roller slots 216 and improve heat dissipation from the friction points.

Figure 10:
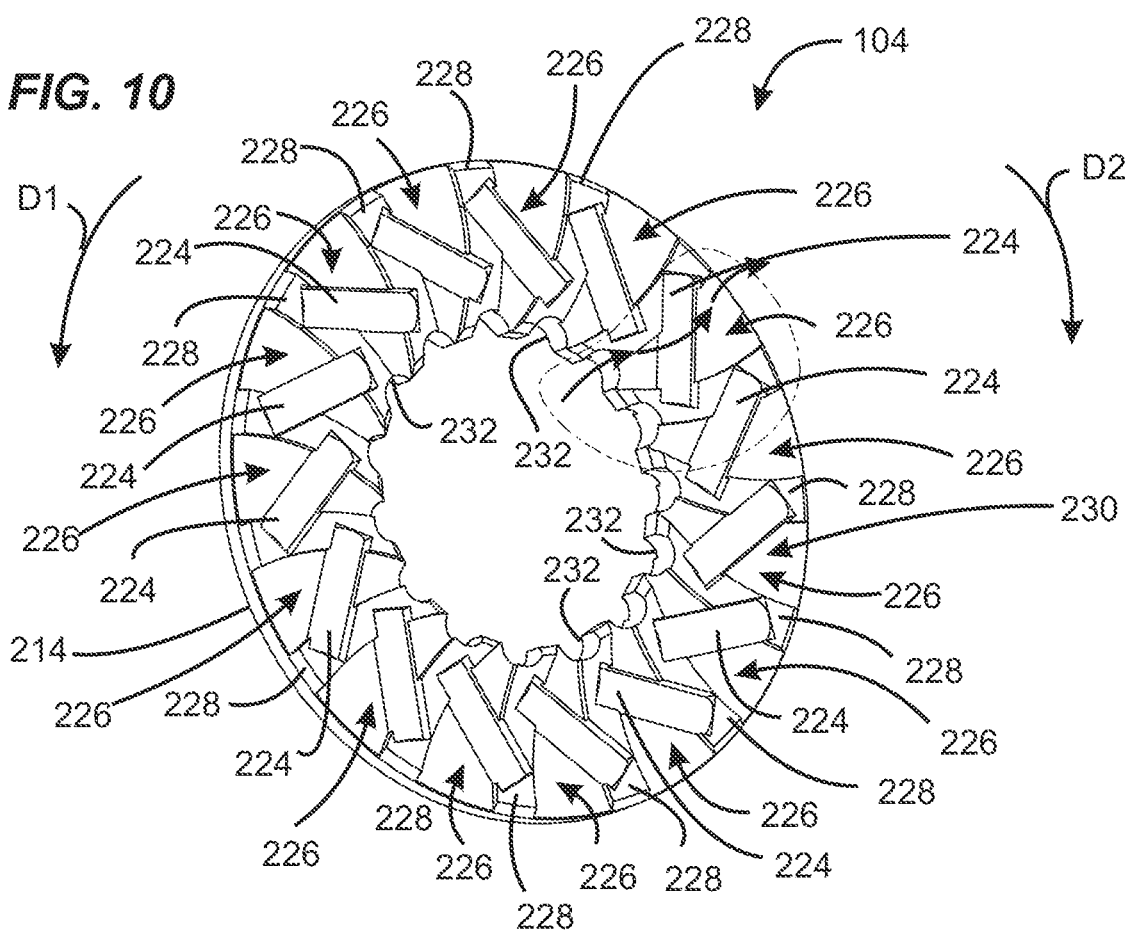
FIG. 10 illustrates a perspective view of a first side of the disc of FIG. 6 with impeller flow channels and cutouts in accordance with the principles of the present disclosure.
Figure 11:
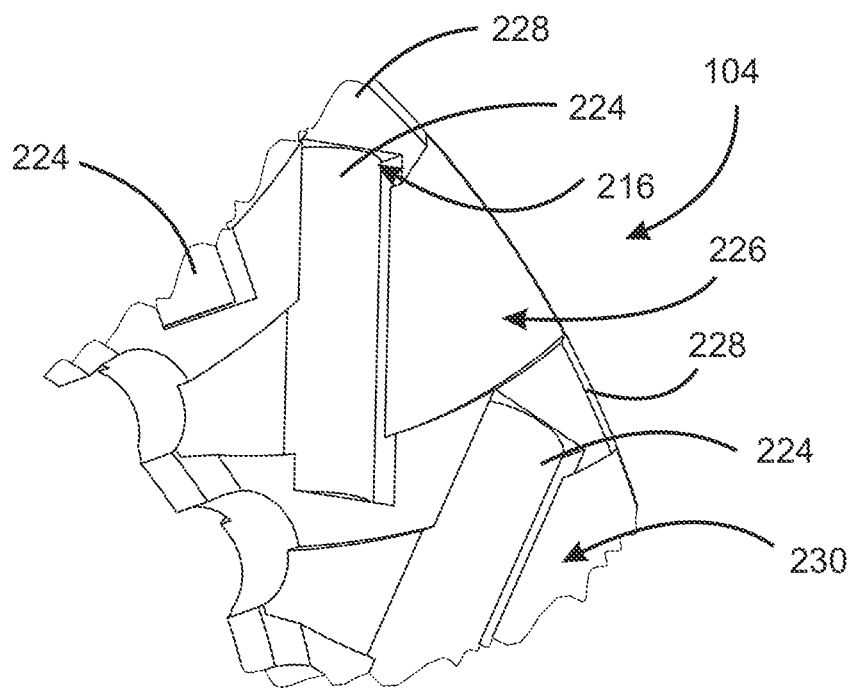
FIG. 11 illustrates an enlarged view of a portion of the disc of FIG. 10.
Figure 12:
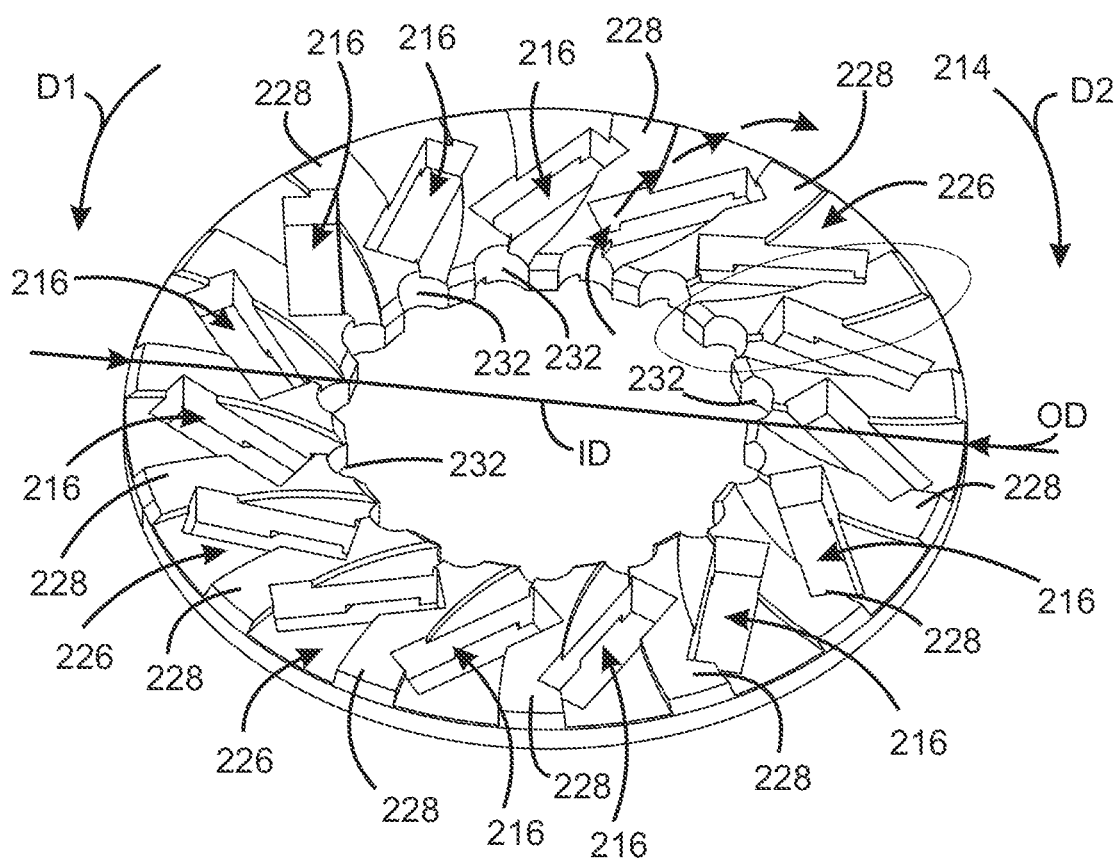
FIG. 12 illustrates another view of the disc of FIG. 10 without the rollers.
Figure 13:
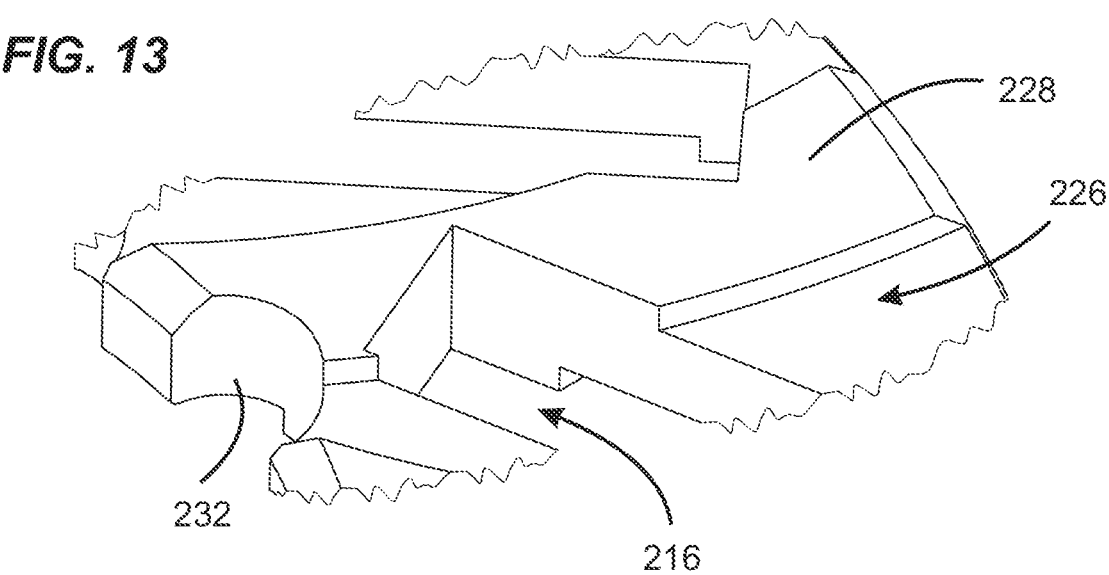
FIG. 13 illustrates an enlarged view of a portion of the disc of FIG. 12.
Figure 14:
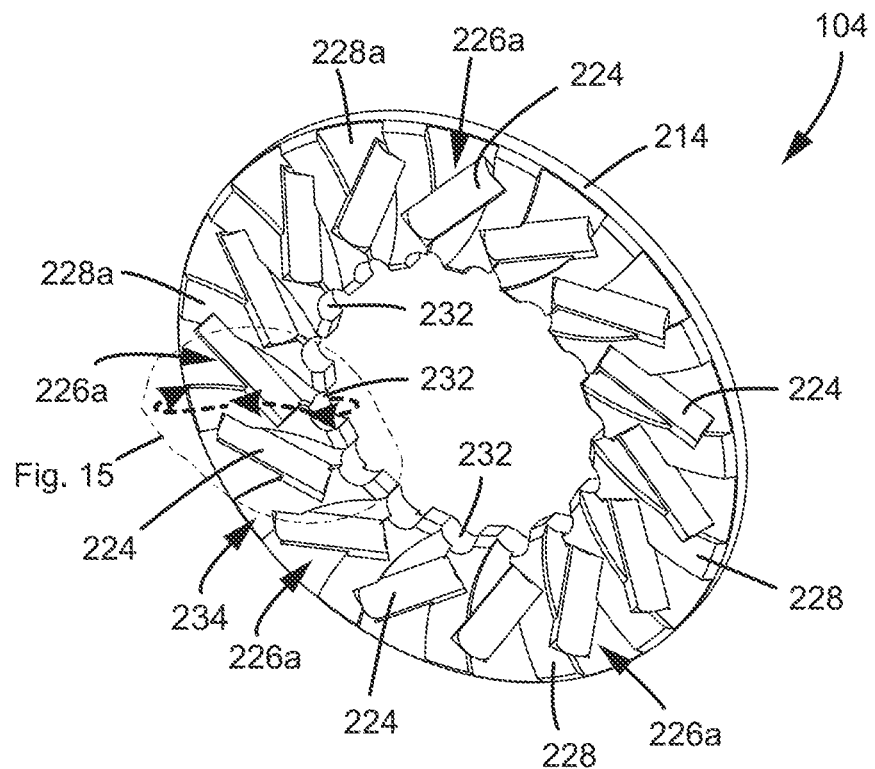
FIG. 14 illustrates a second side of the disc of FIG. 6 illustrating impeller flow channels arranged at a reverse orientation to those shown in FIG. 10.
Figure 15:
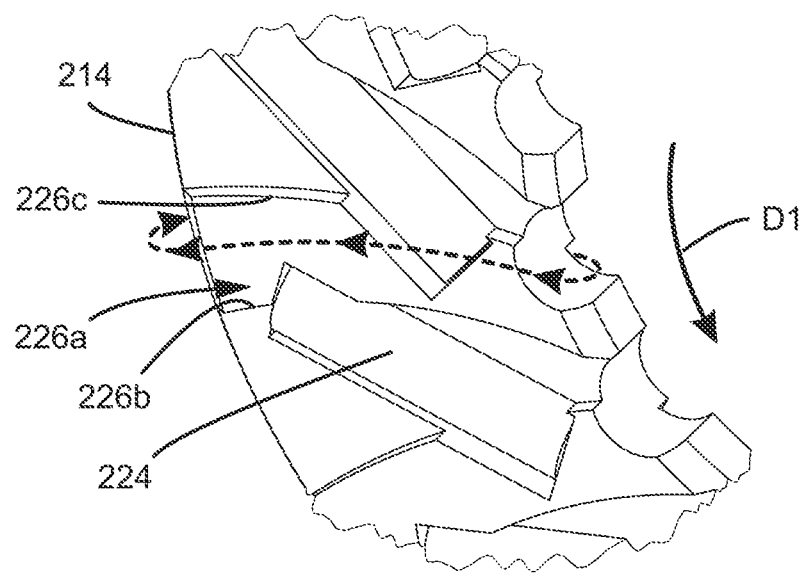
FIG. 15 illustrates an enlarged view of a portion of the disc of FIG. 14.
Figure 16:
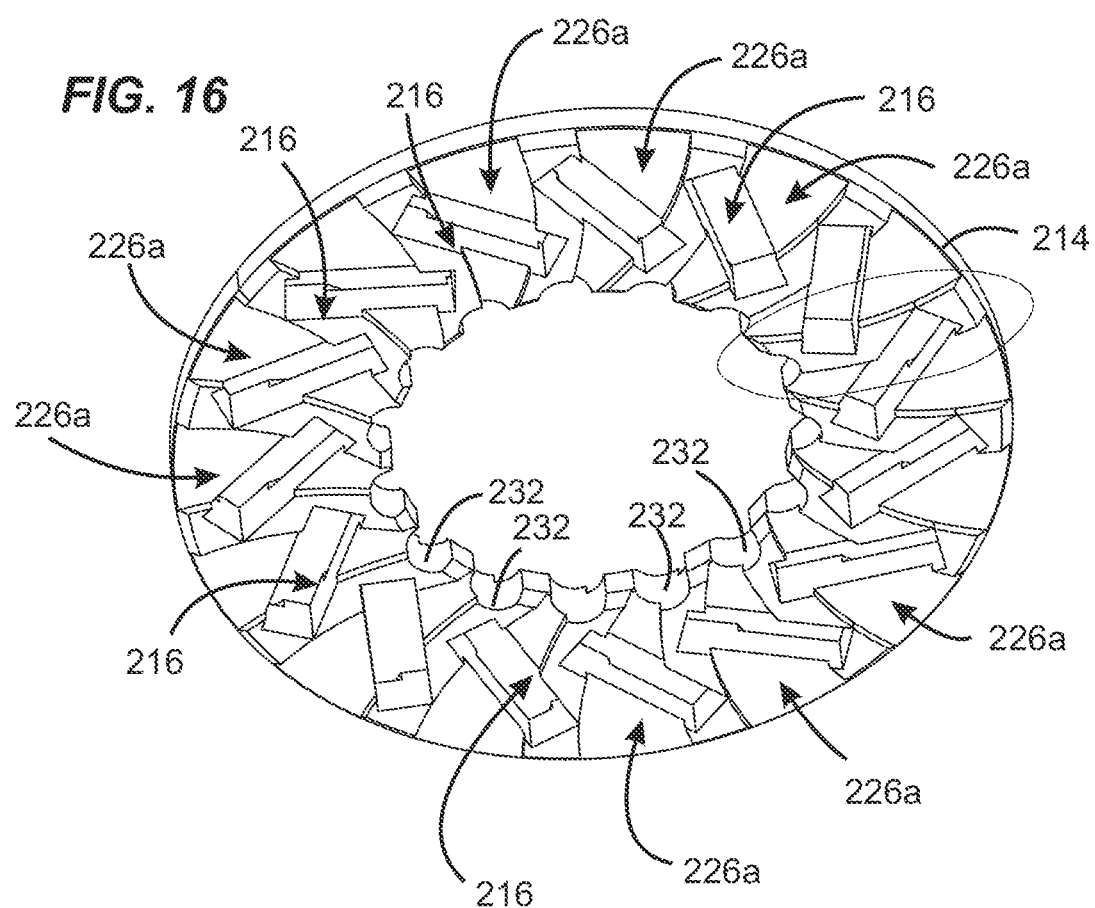
FIG. 16 illustrates a perspective view of the disc of FIG. 14 without the rollers.
Figure 17:
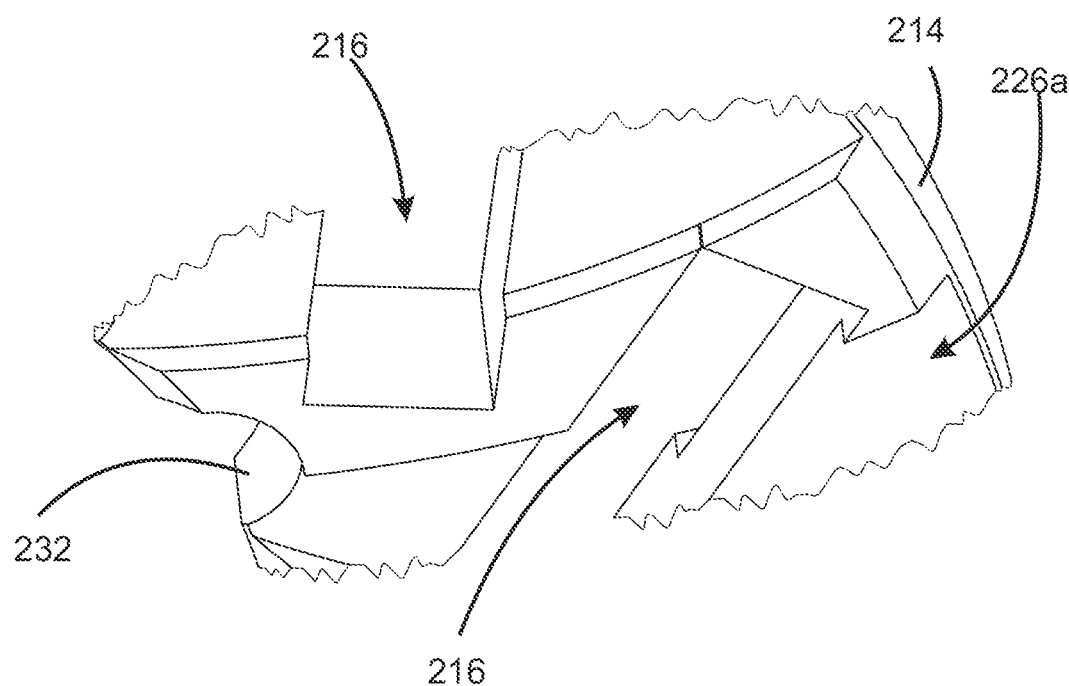
FIG. 17 illustrates an enlarged view of a portion of the disc shown in FIG. 16.

FIGS. 10-11 show a perspective view of the skewed roller assembly 204. The disc 214 includes a plurality of impeller flow channels 226 (e.g., slots) defined by impeller shaped structures 228 arranged on a first side 230 (e.g., top side, high pressure side) of the disc 214. That is, the plurality of impeller flow channels 226 are formed across a surface of the first side 230 from an outer periphery or outer diameter OD of the disc 214 to an inner periphery or inner diameter ID of the disc 214. The plurality of impeller flow channels 226 are arranged in an annular array on the first side 230 of the disc 214 to force lubricating oil between the outer and inner peripheries. The lubricating oil is forced to circulate from the outer diameter OD (see FIG. 12) of the disc 214 to the inner diameter ID (see FIG. 12) of the disc 214 or vice versa. During use, for example when the disc 214 is rotating clockwise, the lubricating oil is designed to flow through the plurality of impeller flow channels 226 on the first side 230 of the disc 214 in a direction from the outer diameter OD toward the inner diameter ID. In certain examples, each roller 224 extends across a respective one of the impeller flow channels 226 so that lubricating fluid flowing through the impeller flow channels 226 also flows over the rollers 224. In certain examples, the center of the rollers 224 may be positioned generally in a center of the plurality of impeller flow channels 226 to allow the lubricating oil to flow over the rollers 224.

The disc 214 further includes cutouts 232, for example semi-circular cutouts, positioned at the inner diameter ID thereof. The cutouts 232 allow lubricating oil to circulate between the first and second sides 230, 234 while the remaining portions of the inner diameter between the cutouts 232 allow the disc 214 to keep tight tolerances for positioning the disc 214 about the rotating member 206. The cutouts 232 provide flow paths past the rotating member 206 to enable the lubricating oil to pass from one side of the disc 214 to the other side of the disc 214. The cutouts 232 allow the lubricating oil to momentarily stay at the inner diameter ID. The cutouts 232 can be defined at both the entrance and exit of the plurality of impeller flow channels 226.

Turning to FIGS. 14-17, perspective views of the disc 214 is depicted showing the second side 234 (e.g., bottom side, low pressure side) thereof. A plurality of impeller flow channels 226a are defined by impeller shaped structures 228a formed on the second side 234 of the disc 214. The plurality of impeller flow channels 226a are arranged in a reverse orientation compared to the plurality of impeller flow channels 226 on the first side 230 of the disc 214. That is, the plurality of impeller flow channels 226a can have a mirrored image to the plurality of impeller flow channels 226.

The plurality of impeller flow channels 226, 226a are designed to scoop lubricating oil over the sides 230, 234 of the disc 214. In one aspect, to provide this effect, the impeller flow channels 226, 226a can be provided with sidewalls 226b, 226c oriented at an oblique angle to a radius line of the disc 214 (e.g., see FIG. 15). In the example shown, the impeller flow channel 226, 226a has a concave shape. In the example shown, the first sidewall 226b can have a convex surface and the second sidewall 226c can have a concave surface. The cutouts 232 are designed to scoop and circulate the lubricating oil from the inner diameter ID of one side of the disc 214 to the opposite side and then outward to the outer diameter OD. That is, lubricating oil can exit the plurality of impeller flow channels 226 on the first side 230 of the disc 214, pass through the cutouts 232, and enter the plurality of impeller flow channels 226a formed on the second side 234 of the disc 214 to keep the lubricating oil circulating over and under the disc 214 between the first and second sides 230, 234.

The disc 214 can rotate either in a clockwise or counterclockwise direction. As such, the lubricating oil can be pulled from either the lower pressure side 234 to the higher-pressure side 230 of the disc 214 or from the higher-pressure side 230 to the lower pressure side 234 of the disc 214.

When the disc 214 is rotating in a counterclockwise direction D1, the plurality of impeller flow channels 226 on the first side 230 can create a high-pressure force such that the lubricating oil flows over the rollers 224 into the cutouts 232 (see FIG. 11). The plurality of impeller flow channels 226 at the first side 230 can act as an impeller, such as a centrifugal pump impeller or a Francis turbine impeller, to create a boost and thereby flow. The cutouts 232 are designed to scoop the lubricating oil against centrifugal forces such that the lubricating oil flows back over to the second side 234 of the disc 214 where the pressure is lower. As the plurality of impeller flow channels 226a are oppositely arranged on the second side 234, the impeller flow channels 226a on the second side 234 guide the lubricant oil from the cutouts 232 to the outer diameter OD of the disc 214 when rotating in the direction D1 (see FIG. 15), whereby the lubricant oil can be recaptured by the impeller flow channels 226 on the first side 230.

When the disc 214 is rotating in a clockwise direction D2, the plurality of impeller flow channels 226a at the second side 234, the opposite of the above-described dynamic occurs in which the impeller flow channels 226a force the lubricant towards the inner diameter ID and the cutouts 232 and the impeller flow channels 226 guide the lubricant back towards the outer diameter OD.

Examples of the disclosure may be described according to the following aspects.

Aspect 1. A skewed roller assembly (204), comprising:
 a disc (214) having a plurality of skewed slots (216) defined therethrough; and
 a plurality of impeller flow channels (226) defined on a first side of the disc (214), each of the impeller flow channels (226) extending between inner and outer diameters (ID, OD) of the disc (214), each of the impeller flow channels (226) extending across a respective one of the skewed slots (216).

Aspect 2. The skewed roller assembly of aspect 1, wherein the plurality of impeller flow channels (226) is a first plurality; and wherein a second plurality of impeller flow channels (226s) are defined at a second side of the disc (214), the second side being opposite the first side.

Aspect 3. The skewed roller assembly of aspect 2, wherein the fluid is a lubricating oil.

Aspect 4. The skewed roller assembly of aspect 2 or aspect 3, wherein the impeller flow channels (226a) of the second plurality are disposed in reverse orientation to the impeller flow channels (226) of the first plurality.

Aspect 5. The skewed roller assembly of any of aspects 1-4, wherein a plurality of cutouts (232) are defined at an inner diameter of the disc (214), each of the impeller flow channels (226) extending to a respective one of the cutouts (232).

Aspect 6. The skewed roller assembly of any of aspects 2-4, wherein a plurality of cutouts (232) are defined at an inner diameter of the disc (214), each cutout (232) forming a path from one of the impeller flow channels (226) of the first plurality to a corresponding impeller flow channel (226a) of the second plurality.

Aspect 7. The skewed roller assembly of aspect 6, wherein fluid flow is directed to circulate through the first plurality of impeller flow channels (226), through the cutouts (232), and then through the second plurality of impeller flow channels (226a).

Aspect 8. The skewed roller assembly of any of aspects 5-7, wherein the cutouts (232) define semi-circles disposed about an inner circumference of the disc (214).

Aspect 9. The skewed roller assembly of any of aspects 5-8, wherein the cutouts (232) allow fluid to remain momentarily before circulating from the inner diameter (ID) out to the outer diameter (OD).

Aspect 10. The skewed roller assembly of any of aspects 1-9, wherein each one of the plurality of skewed slots (216) has a longitudinal axis (218) that extends through a center of the skewed slot (216), the longitudinal axis (218) being skewed at an angle relative to a radius (220) of the disc (214).

Aspect 11. The skewed roller assembly of any of aspects 1-10, wherein a plurality of rollers (224) are disposed at the disc (214), each roller (224) being retained at one of the skewed slots (216) so that the roller (224) extends across the respective impeller flow channel (226, 226a).

Aspect 12. The skewed roller assembly of any of aspects 1-11, wherein the plurality of skewed slots (216) are spaced in an annular array.

Aspect 13. The skewed roller assembly of any of aspects 1-12, wherein the impeller flow channels (226, 226*a*) of the first and second pluralities are oriented at an oblique angle relative to a radius line (220) of the disc (214).

Aspect 14. A rotary device (200) comprising:
a brake member (202);
a rotating member (206) configured to rotate relative to the brake member (202), the rotating member (206) defining a flange (212); and
the skewed roller assembly (204) as claimed in aspect 1, the skewed roller assembly (204) mounted over the rotating member (206), the skewed roller assembly (204) being axially disposed between the brake member (202) and the flange (212) of the rotating member (206).

Aspect 15. The rotary device of aspect 14, wherein the rotary device (200) is a no back rotary device.

Aspect 16. A skewed roller assembly, comprising:
a disc having a first side and an opposite second side, the disc including an inner diameter and an outer diameter;
a plurality of skewed slots defined through the disc;
a roller retained in each one of the plurality of skewed slots;
a first plurality of impeller flow channels defined on the first side of the disc;
a second plurality of impeller flow channels defined on the second side of the disc, wherein the second plurality of impeller flow channels are formed in a reverse orientation to the first plurality of impeller flow channels; and
cutouts positioned adjacent to the first and second pluralities of impeller flow channels to provide a fluid entrance and a fluid exit for continuously circulating fluid around the disc.

Aspect 17. The skewed roller assembly of aspect 16, wherein fluid flow is directed to circulate through the first plurality of impeller flow channels, through the cutouts, and then through the second plurality of impeller flow channels.

Aspect 18. The skewed roller assembly of aspect 16, wherein the cutouts are defined at the inner diameter of the disc.

Aspect 19. The skewed roller assembly of aspect 16, wherein the fluid is a lubricating oil.

Aspect 20. The skewed roller assembly of aspect 16, wherein each one of the plurality of skewed slots has a longitudinal axis that extends through a center of the skewed slot, the longitudinal axis being skewed at an angle relative to a disc radius.

Aspect 21. The skewed roller assembly of aspect 16, wherein the plurality of skewed slots are spaced in an annular array.

Aspect 22. The skewed roller assembly of aspect 21, wherein the plurality of skewed slots have a skewing angle within the range of about 0 degrees to about 90 degrees.

Aspect 23. The skewed roller assembly of aspect 21, wherein the plurality of skewed slots have a skewing angle within the range of about 30 degrees to about 60 degrees.

Aspect 24. The skewed roller assembly of aspect 16, wherein the first and second pluralities of impeller flow channels include sidewalls oriented at an oblique angle relative to a radius line of the disc.

Aspect 25. A skewed roller assembly, comprising:
a disc having a plurality of skewed slots defined therethrough;
a roller retained in each one of the plurality of skewed slots; and
a plurality of impeller flow channels defined on a first side of the disc, each of the impeller flow channels extending past a respective one of the skewed slots so that each roller extends across a respective one of the impeller flow channels.

Aspect 26. The skewed roller assembly of aspect 25, wherein a plurality of cutouts are defined at an inner diameter of the disc, each of the impeller flow channels extending to a respective one of the cutouts.

Aspect 27. The skewed roller assembly of aspect 25, wherein the plurality of impeller flow channels is a first plurality; and wherein a second plurality of impeller flow channels are defined at a second side of the disc, the second side being opposite the first side.

Aspect 28. The skewed roller assembly of aspect 27, wherein the impeller flow channels of the second plurality are disposed in reverse orientation to the impeller flow channels of the first plurality.

Aspect 29. The skewed roller assembly of aspect 28, wherein a plurality of cutouts are defined at an inner diameter of the disc, each cutout forming a path from one of the impeller flow channels of the first plurality to a corresponding impeller flow channel of the second plurality.

Aspect 30. The skewed roller assembly of aspect 25, wherein the cutouts allow fluid to remain momentarily before circulating from the inner diameter out to the outer diameter.

Aspect 31. The skewed roller assembly of aspect 25, wherein the fluid is a lubricating oil.

Aspect 32. The skewed roller assembly of aspect 25, wherein each one of the plurality of skewed slots has a longitudinal axis that extends through a center of the skewed slot, the longitudinal axis being skewed at an angle relative to a radius of the disc.

Aspect 33. A disc for use in a skewed roller assembly, comprising:
a main body defining a plurality of skewed slots therethrough;
a first plurality of impeller flow channels defined on a top side of the main body;
a second plurality of impeller flow channels defined on a bottom side of the main body, wherein the second plurality of impeller flow channels are formed in a reverse orientation to the first plurality of impeller flow channels, the first and second pluralities of impeller flow channels each having entrance and exit points at an inner diameter of the main body.

Aspect 34. The disc of aspect 33, wherein a plurality of cutouts are positioned adjacent to the entrance and exit points of the first and second pluralities of impeller flow channels.

Aspect 35. The disc of aspect 33, wherein the cutouts define semi-circles disposed about an inner circumference of the disc.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:
1. A skewed roller assembly, comprising:
a disc having a first side and an opposite second side, the disc including an inner diameter and an outer diameter;
a plurality of skewed slots defined through the disc;

a roller retained in each one of the plurality of skewed slots;
a first plurality of impeller flow channels defined on the first side of the disc;
a second plurality of impeller flow channels defined on the second side of the disc, wherein the second plurality of impeller flow channels are formed in a reverse orientation to the first plurality of impeller flow channels; and
cutouts positioned adjacent to the first and second pluralities of impeller flow channels to provide a fluid entrance and a fluid exit for continuously circulating fluid around the disc.

2. The skewed roller assembly of claim 1, wherein fluid flow is directed to circulate through the first plurality of impeller flow channels, through the cutouts, and then through the second plurality of impeller flow channels.

3. The skewed roller assembly of claim 1, wherein the cutouts are defined at the inner diameter of the disc.

4. The skewed roller assembly of claim 1, wherein the fluid is a lubricating oil.

5. The skewed roller assembly of claim 1, wherein each one of the plurality of skewed slots has a longitudinal axis that extends through a center of the skewed slot, the longitudinal axis being skewed at an angle relative to a disc radius.

6. The skewed roller assembly of claim 1, wherein the plurality of skewed slots are spaced in an annular array.

7. The skewed roller assembly of claim 6, wherein the plurality of skewed slots have a skewing angle within the range of about 0 degrees to about 90 degrees.

8. The skewed roller assembly of claim 6, wherein the plurality of skewed slots have a skewing angle within the range of about 30 degrees to about 60 degrees.

9. The skewed roller assembly of claim 1, wherein the first and second pluralities of impeller flow channels include sidewalls oriented at an oblique angle relative to a radius line of the disc.

10. A skewed roller assembly, comprising:
a disc having a plurality of skewed slots defined therethrough;
a roller retained in each one of the plurality of skewed slots; and
a plurality of impeller flow channels defined on a first side of the disc, each of the impeller flow channels extending past a respective one of the skewed slots so that each roller extends across a respective one of the impeller flow channels.

11. The skewed roller assembly of claim 10, wherein a plurality of cutouts are defined at an inner diameter of the disc, each of the impeller flow channels extending to a respective one of the cutouts.

12. The skewed roller assembly of claim 10, wherein the plurality of impeller flow channels is a first plurality; and wherein a second plurality of impeller flow channels are defined at a second side of the disc, the second side being opposite the first side.

13. The skewed roller assembly of claim 12, wherein the impeller flow channels of the second plurality are disposed in reverse orientation to the impeller flow channels of the first plurality.

14. The skewed roller assembly of claim 13, wherein a plurality of cutouts are defined at an inner diameter of the disc, each cutout forming a path from one of the impeller flow channels of the first plurality to a corresponding impeller flow channel of the second plurality.

15. The skewed roller assembly of claim 10, wherein the cutouts allow fluid to remain momentarily before circulating from the inner diameter out to the outer diameter.

16. The skewed roller assembly of claim 10, wherein the fluid is a lubricating oil.

17. The skewed roller assembly of claim 10, wherein each one of the plurality of skewed slots has a longitudinal axis that extends through a center of the skewed slot, the longitudinal axis being skewed at an angle relative to a radius of the disc.

18. A disc for use in a skewed roller assembly, comprising:
a main body defining a plurality of skewed slots entirely through the main body, wherein the skewed slots are skewed at an angle to a radius line of the main body;
a first plurality of impeller flow channels defined on a first side of the main body;
a second plurality of impeller flow channels defined on a second side of the main body, wherein the second plurality of impeller flow channels are formed in a reverse orientation to the first plurality of impeller flow channels, the first and second pluralities of impeller flow channels each having entrance and exit points at an inner diameter of the main body, and wherein each of the first and second impeller flow channels extending across a respective one of the skewed slots.

19. The disc of claim 18, wherein a plurality of cutouts are positioned adjacent to the entrance and exit points of the first and second pluralities of impeller flow channels.

20. The disc of claim 18, wherein the cutouts define semi-circles disposed about an inner circumference of the disc.

21. A disc for use in a skewed roller assembly, comprising:
a main body defining a plurality of skewed slots through the main body;
a first plurality of impeller flow channels defined on a first side of the main body, each of the first plurality of impeller flow channels extending from an outer diameter to an inner diameter of the main body;
a second plurality of impeller flow channels defined on a second side of the main body, wherein the first and second plurality of impeller flow channels are oriented at an oblique angle to a radius line of the main body from the outer diameter to the inner diameter, wherein the second plurality of impeller flow channels are formed in a reverse orientation to the first plurality of impeller flow channels, the first and second pluralities of impeller flow channels each having entrance and exit points at the inner diameter of the main body.

* * * * *